US008118679B2

(12) United States Patent
Gagner

(10) Patent No.: US 8,118,679 B2
(45) Date of Patent: Feb. 21, 2012

(54) PEER-TO-PEER DISTRIBUTED GAMING APPLICATION NETWORK

(75) Inventor: Mark B. Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 819 days.

(21) Appl. No.: 11/425,481

(22) Filed: Jun. 21, 2006

(65) Prior Publication Data

US 2006/0247011 A1 Nov. 2, 2006

Related U.S. Application Data

(63) Continuation of application No. 10/453,425, filed on Jun. 3, 2003, now Pat. No. 7,097,562.

(51) Int. Cl.
*A63F 9/24* (2006.01)
*G06F 17/00* (2006.01)

(52) U.S. Cl. ................ 463/42; 463/16; 463/20; 463/25; 463/40; 709/205; 705/1; 713/151

(58) Field of Classification Search ........................ None
See application file for complete search history.

(56) References Cited

U.S. PATENT DOCUMENTS 4,636,951 A 1/1987 Harlick
4,856,787 A 8/1989 Itkis
5,738,583 A 4/1998 Comas et al.
5,755,621 A 5/1998 Marks et al.
5,956,485 A 9/1999 Perlman
5,984,779 A * 11/1999 Bridgeman et al. ............ 463/16
6,093,100 A 7/2000 Singer et al.
6,287,202 B1 9/2001 Pascal et al.
6,311,209 B1 10/2001 Olson et al.
6,319,122 B1 11/2001 Packes, Jr. et al.
RE37,885 E 10/2002 Acres et al.
6,503,146 B2 1/2003 Walker et al.
6,560,636 B2 * 5/2003 Cohen et al. .................. 709/203
7,383,061 B1 * 6/2008 Hawkins .................... 455/556.2
2002/0035604 A1 * 3/2002 Cohen et al. .................. 709/205
2002/0059379 A1 * 5/2002 Harvey et al. ................. 709/205
2002/0116615 A1 * 8/2002 Nguyen et al. ................ 713/168
2002/0137217 A1 9/2002 Rowe (Continued)

FOREIGN PATENT DOCUMENTS

GB 2379589 A1 3/2003

(Continued)

OTHER PUBLICATIONS

"U.S. Appl. No. 11/425,476, Non-Final Office Action mailed Aug. 8, 2008", 18 pgs.

(Continued)

*Primary Examiner* — Paul A. D'Agostino
(74) *Attorney, Agent, or Firm* — Schwegman, Lundberg & Woessner, P.A.

(57) ABSTRACT

This description describes methods and apparatuses of a peer-to-peer distributed gaming application networks. In one embodiment the method includes transmitting, to a first gaming terminal, an invitation to participate in a shared gaming session. The method also includes receiving a reply from the first gaming terminal indicating that the invitation has been accepted and transmitting, to a second gaming terminal, an indication that the first gaming terminal will participate in the shared gaming session, wherein the second gaming terminal will serve a gaming application to the first gaming terminal.

26 Claims, 6 Drawing Sheets

U.S. PATENT DOCUMENTS

| | | | | |
|---|---|---|---|---|
| 2002/0138594 | A1 | 9/2002 | Rowe | |
| 2002/0143960 | A1 | 10/2002 | Goren et al. | |
| 2002/0165023 | A1 | 11/2002 | Brosnan et al. | |
| 2002/0173355 | A1 | 11/2002 | Walker et al. | |
| 2003/0036429 | A1 | 2/2003 | Witty et al. | |
| 2003/0078088 | A1 | 4/2003 | Schneider | |
| 2003/0130041 | A1 | 7/2003 | Pascal et al. | |
| 2003/0199308 | A1 | 10/2003 | Parker | |
| 2003/0217135 | A1 | 11/2003 | Chatani et al. | |
| 2003/0233537 | A1 * | 12/2003 | Wohlgemuth et al. | 713/151 |
| 2005/0014554 | A1 | 1/2005 | Walker et al. | |
| 2006/0247010 | A1 | 11/2006 | Gagner | |

FOREIGN PATENT DOCUMENTS

| | | | |
|---|---|---|---|
| GB | 2379579 | | 12/2003 |
| WO | WO-0242921 | A1 | 5/2002 |
| WO | WO-02093373 | A1 | 11/2002 |
| WO | WO-03/014955 | A1 | 2/2003 |

OTHER PUBLICATIONS

"U.S. Appl. No. 11/425,476, Response filed Feb. 9, 2009 to Non-Final Office Action mailed Aug. 8, 2008", 11 pgs.

"Australian Application Serial No. 2004202443, First Examination Report mailed Jun. 3, 2009", 2 pgs.

"Canadian Application Serial No. 2,469,587, Office Action mailed Jan. 19, 2009", 10 pgs.

"United Kingdom Application Serial No. GB0412286.7, Examination Report dated Jul. 14, 2006", 2 pgs.

"United Kingdom Application Serial No. GB0412286.7, Response filed Nov. 9, 2006 to Examination Report dated Jul. 14, 2006", 26 pgs.

"U.S. Appl. No. 10/453,425, Final Office Action mailed Feb. 23, 2005", 9 pgs.

"U.S. Appl. No. 10/453,425, Final Office Action mailed Feb. 24, 2006", 8 pgs.

"U.S. Appl. No. 10/453,425, Non-Final Office Action mailed Aug. 23, 2005", 8 pgs.

"U.S. Appl. No. 10/453,425, Non-Final Office Action mailed Sep. 21, 2004", 6 pgs.

"U.S. Appl. No. 10/453,425, Notice of Allowance mailed May 17, 2006", 6 pgs.

"U.S. Appl. No. 10/453,425, Response filed Apr. 24, 2006 to Final Office Action mailed Feb. 24, 2006", 13 pgs.

"U.S. Appl. No. 10/453,425, Response filed May 23, 2005 to Final Office Action mailed Feb. 23, 2005", 16 pgs.

"U.S. Appl. No. 10/453,425, Response filed Nov. 29, 2004 to Non-Final Office Action mailed Sep. 21, 2004", 15 pgs.

"U.S. Appl. No. 10/453,425, Response filed Nov. 29, 2005 to Office Action mailed Aug. 23, 2005", 15 pgs.

"U.S. Appl. No. 11/425,476 Non-Final Office Action mailed Aug. 19, 2010", 19.

"U.S. Appl. No. 11/425,476, Final Office Action mailed Feb. 1, 2011", 15 pgs.

"U.S. Appl. No. 11/425,476, Final Office Action mailed Aug. 3, 2009", 17 pgs.

"U.S. Appl. No. 11/425,476, Response filed Dec. 20, 2010 to Non Final Office Action mailed Aug. 19, 2010", 10 pgs.

"Australian Application Serial No. 2004202443, Examiner Report mailed Jan. 20, 2011", 3 pgs.

"Australian Application Serial No. 2004202443, Examiner Report mailed Jun. 24, 2010", 3 pgs.

"Australian Application Serial No. 2004202443, Response filed May 26, 2010 to Examination Report mailed Jun. 3, 2009", 19 pgs.

Australian Serial No. 2004202443, Response filed Feb. 28, 2011, to Subsequent Examiner Report mailed Jan. 20, 2011, 17 pgs.

"Canadian Application Serial No. 2,469,587, Amendment/Remarks filed Jul. 20, 2009 to Office Action/Examiner's Report mailed Jan. 19, 2009", 30 pgs.

"Canadian Application Serial No. 2469587, Notice of Allowance Mailed Dec. 23, 2009", 1 pg.

"United Kingdom Application Serial No. GB0412286.7, Search Report dated Aug. 23, 2004", 1 pg.

Clark, D., "Face-to-Face with Peer-to-Peer Networking", Computer, 34(1), (2001), 18-21.

* cited by examiner

PEER-TO-PEER DISTRIBUTED GAMING APPLICATION NETWORK

RELATED APPLICATIONS

This application is a Continuation of U.S. patent application Ser. No. 10/453,425, filed Jun. 3, 2003, now U.S. Pat. No. 7,097,562 which application is incorporated herein by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, WMS Gaming, Inc.

FIELD

Some embodiments relate generally to gaming terminals and, more particularly, to a system and method for networking gaming terminals to allow gaming terminals to participate in the same wagering game.

BACKGROUND

Gambling has become an increasingly important and popular form of entertainment. Particularly important to the gaming industry are electronic gaming terminals that can provide a wide variety of entertainment formats to individual players. Electronic gaming terminals may, for example, include reel slot machines, video poker machines, and video bingo machines. Because such gaming terminals are an important source of income for the gaming industry, casinos continually search for new ways to improve the profitability of their gaming machines by increasing functional capabilities. This includes improving their entertainment value by providing more sophisticated games, visual/audio displays, and user-friendly interfaces. It also includes better gaming terminal security, player tracking data for customizing marketing strategies, and more sophisticated financial and accounting reports.

Originally gaming machines were provided as stand alone devices that operated independently. Today, most gaming machines are in serial communication with at least one computer that provides serial polling of the gaming machines in a master-slave communication protocol to obtain gaming terminal data. Typically, each gaming function is performed by a separate host computer, which operates independently of any other host computers connected to the gaming machines. For example, an accounting computer, a player tracking computer, and a progressive game computer may all operate independently to perform a specific function.

Although these gaming terminals are connected to a central host computer, a gaming terminal is unable to share a wagering game experience with any other gaming terminal. This precludes any type of competitive or collaborative gaming, and any other type of shared game interaction with another player. These serial-based systems have limited communication capabilities. To support these new gaming wagering methods effectively and adequately, new types of networked systems are needed to support competitive and collaborative types of wagering games, allowing players to share the same gaming experience.

Some manufacturers have proposed developing a network of gaming terminals controlled by a server to provide gaming applications to each individual gaming terminal. In these systems, the distributed application server determines the game outcome and delivers the results of the game to the gaming terminal. This type of gaming system is termed central determination. The gaming terminals simply function as presentation devices for the distributed application server. This configuration presents problems on two regulatory fronts.

First, central determination of a game outcome is illegal and not allowed in many jurisdictions. Second, even if the jurisdictions do allow the central determination of game outcomes, such a server would have to be licensed as a gaming device in that jurisdiction. To license a server requires specialized testing in individual jurisdictions and represents another hurdle for gaming manufacturers to overcome.

In addition, using a central server for serving gaming applications has certain technological problems. First, the communication traffic in such a centralized system is extremely heavy. All game play information must be first communicated to the server and then relayed to those gaming terminals on which a gaming application is being shared. The long communication path can create latency problems that prevent the game from playing sufficiently quickly. In addition, timing becomes much more critical for competitive and collaborative gaming where a player may be given a limited time to respond to the game action.

An additional problem with centrally served games is that players may want to play individual games, rather than participating in a shared gaming experience. A central server could potentially be heavily burdened supporting many individual gaming terminals. Such a system is susceptible to a single failure with the potential for incapacitating large numbers of gaming terminals on the network.

To overcome these problems, a new gaming terminal network is required that allows players at different terminals to participate in a shared gaming experience with other players.

DETAILED DESCRIPTION

Figure 1:
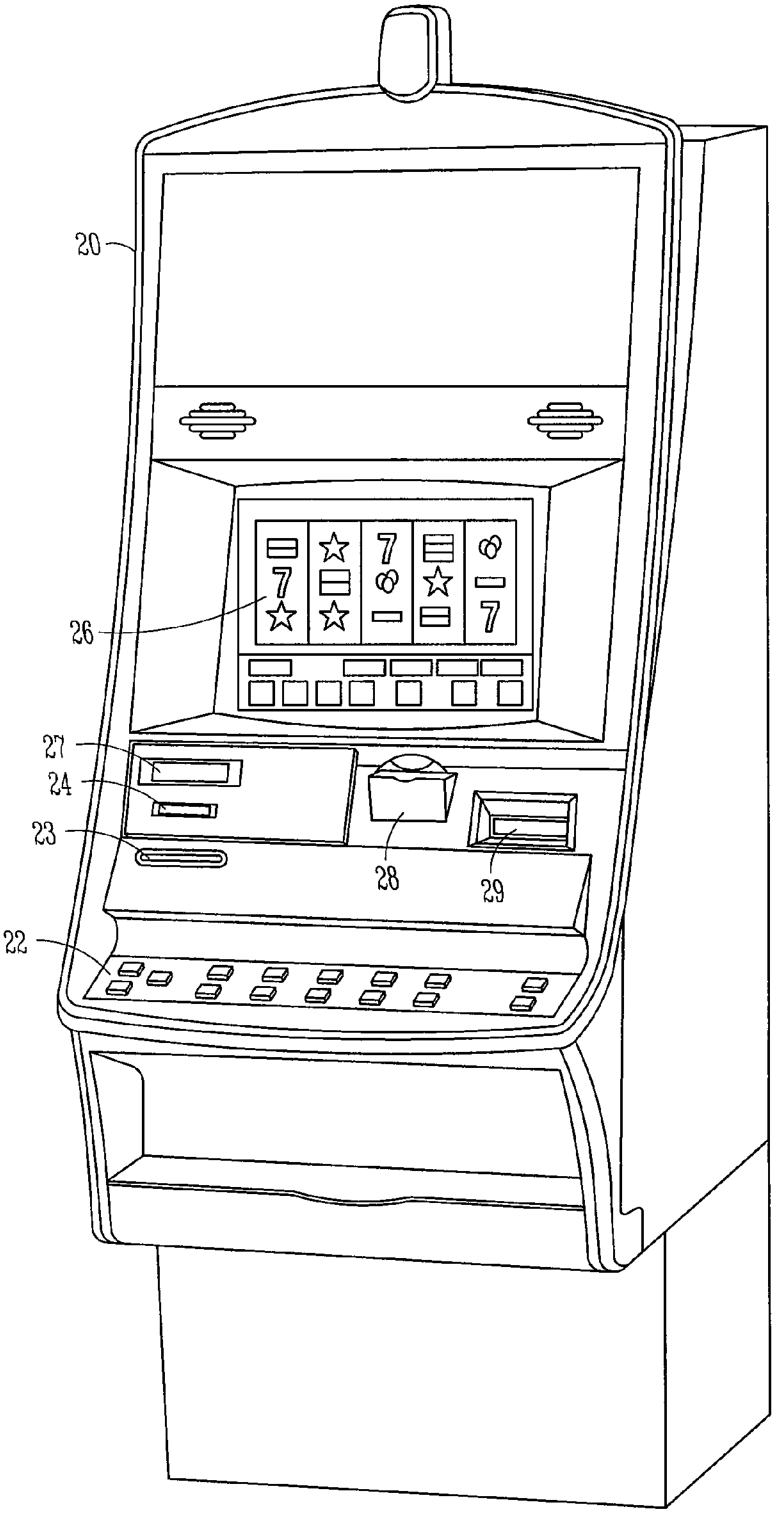
FIG. 1 (PRIOR ART)
FIG. 1 is a perspective view of an embodiment of a gaming terminal.

The description of the preferred examples is to be construed as exemplary only and does not describe every possible embodiment of the invention. Many alternative embodiments could be implemented, using either current technology or technology developed after the filing date of this patent, which would still fall within the scope of the claims defining some embodiments of the invention.

Some embodiments enable many players to share and participate in the same game experience from their individual gaming terminals. Player participation may be either passive or active participation. Passive participation may allow a player to wager on another player's outcome. Active participation may include competitive or collaborative gaming that allows a player to participate in the shared game experience by making individual selections and decisions during the game that may affect the game outcome.

For example, in a passive game, a player may win a base game and be offered a bonus game. Such a bonus game may also be offered to players in a select group, allowing the other players to place side bets on the outcome of the bonus game. Alternately, in an active participation game, players may compete by making individual selections that may determine the winner of the bonus game.

To enable this game participation among players, some embodiments utilize a gaming network having a server linked to a number of gaming terminals. The server in the gaming network establishes a separate virtual communication network. This virtual communication network is used to establish a distributed gaming session that shares a gaming application among a number of participating gaming terminals within the gaming network.

The virtual communication network is a network of gaming terminals structured through a peer-to-peer network architecture. In contrast to a central server, the use of a peer-to-peer architecture allows the gaming terminals themselves to be used as the server of the gaming application to other gaming terminals. A distributed application server is still used, but it is dedicated to providing the shared gaming session's administrative functions.

The distributed gaming server has at least two primary functions. The first is to help establish a virtual communication network between selected gaming terminals sharing game applications. These communication channels are required to ensure all gaming application messages sent are received by the appropriate gaming terminals. Once these communication channels are established, the gaming application data is transmitted directly between selected gaming terminals. The second function of the distributed gaming server is to administratively control the shared gaming experience session. The server remains in the background, constantly monitoring the gaming session, and always available to manage gaming terminal participation when players enter and leave the shared gaming application.

Some embodiments facilitate shared, collaborative, and competitive gaming among players. They accomplish this task through their peer-to-peer network architecture. Additional aspects of some embodiments of the invention will be apparent to those of ordinary skill in the art in view of the detailed description of various embodiments which is provided below.

Some embodiments provide a gaming system and method for allowing multiple gaming terminals to participate in shared game play occurring at another terminal. The shared game experience may be competitive, collaborative, or shared. Participation in the game may be passive, such as placing a side bet. Participation may also be active, such as direct competition with other players, or collaborative team play.

Players may have the option of participating in the shared game play, or playing the individual games offered at their own gaming terminal. The player-shared games may be in addition to any individual game a player may be playing or instead of the individual game. Individual games may become shared games as desired by the player. Further, individual games may be associated with the shared game such that the outcome in the individual game affects the outcome in the shared game. The distribution of shared games from a gaming terminal to other gaming terminals may be described as a distributed gaming session.

Some embodiments may use any gaming terminal that is network enabled with a peer-to-peer architecture. FIG. 1 shows a perspective view of a typical gaming terminal 20 that may be used with this peer-to-peer architecture. The gaming terminal may have varying structures and methods of operation. For example, the gaming terminal 20 may be a mechanical gaming terminal configured to play mechanical slots, or it may be an electro mechanical or electrical gaming terminal configured to play a video casino game such as blackjack, slots, keno, poker, etc. Typical components found in a gaming terminal 20 are described below. It should be understood that many other elements exist and may be used in any number of combinations to create a variety of gaming terminal types.

The game itself is displayed to the player on a visual display 26, such as a video display. The video display may take the form of a cathode ray tube (CRT), a high resolution LCD, a plasma display, LED, or any other type of video display suitable for use in a gaming terminal. The visual display 26 may include a touch screen overlaying the monitor to allow players to make game related selections. In the alternative, instead of a video display, the gaming terminal 20 may have several mechanical reels to display the game outcome.

A push button panel 22 is also typically offered, in addition to the touch screen, to provide players an option on how they make their game selections. A wager acceptor may include a coin slot acceptor 28 or a note acceptor 29 to enter value to the gaming terminal 20.

Many gaming terminals are also equipped with a player tracking card reader 24. A player may be enrolled in the gaming establishment's player club and may be awarded certain complimentary services/offers as that player collects points on his player tracking account. The player inserts his card into the reader, which allows the casinos computers to register that player's play at that gaming terminal. The gaming terminal 20 may also include a display 27 to be used with the player tracking card and card reader 24.

Many gaming establishments are implementing systems that are less dependent on cash. These systems often rely on ticket printers 23 that are installed on the gaming terminal 20. These ticket printers may be used to print and/or read ticket vouchers, which are encoded with some monetary value. Typically these systems utilize a barcode and barcode reader to read the ticket voucher, which generally contains the casino name, ticket voucher validation number, etc.

Figure 2:
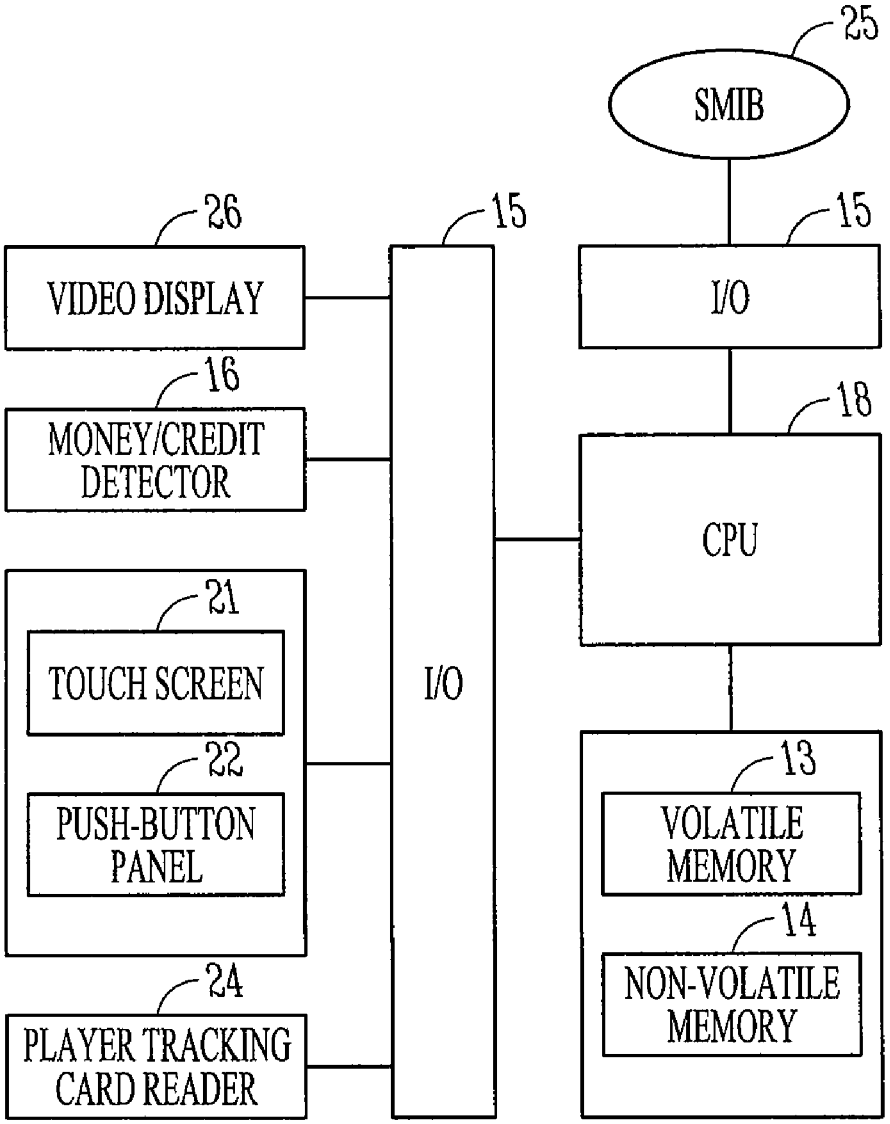
FIG. 2 is a block diagram of the electronic components typically used in the gaming terminal of FIG. 1.

These various potential components of a gaming terminal are controlled by a central processing unit (CPU) 18 (such as a microprocessor or micro controller) as shown in FIG. 2. The central processing unit 18 operates to execute a game program. The CPU 18 may comprise a volatile memory 13 (e.g., a random-access memory (RAM)), a non-volatile (or static memory) 14 (such as an EEPROM), and an input/output (I/O) circuit 15. It should be appreciated that although only one microprocessor is shown, the central processing unit may include multiple microprocessors. Similarly, the memory of the central processing unit may include multiple RAM and multiple program memories. Although the I/O circuit may be shown as a single block, it should be appreciated that the I/O circuit may include many different types of I/O circuits. A SMIB 25 (also known as a slot machine interface board) is also shown. The SMIB is used as the communication interface between the slot machine and servers used in the typical master-slave communication protocol. However, some embodiments could just as easily be implemented in a client/server network.

In addition to executing the game program, the CPU also controls and is in communication with each of the peripheral devices comprising the gaming terminal. A variety of peripheral devices may be used in a gaming terminal. Peripheral devices may include a push button panel 22, a player tracking card reader 24, a video display 26, etc. Although several peripheral devices are depicted in FIG. 2, more or fewer peripheral devices may be included in a gaming terminal.

Figure 3:
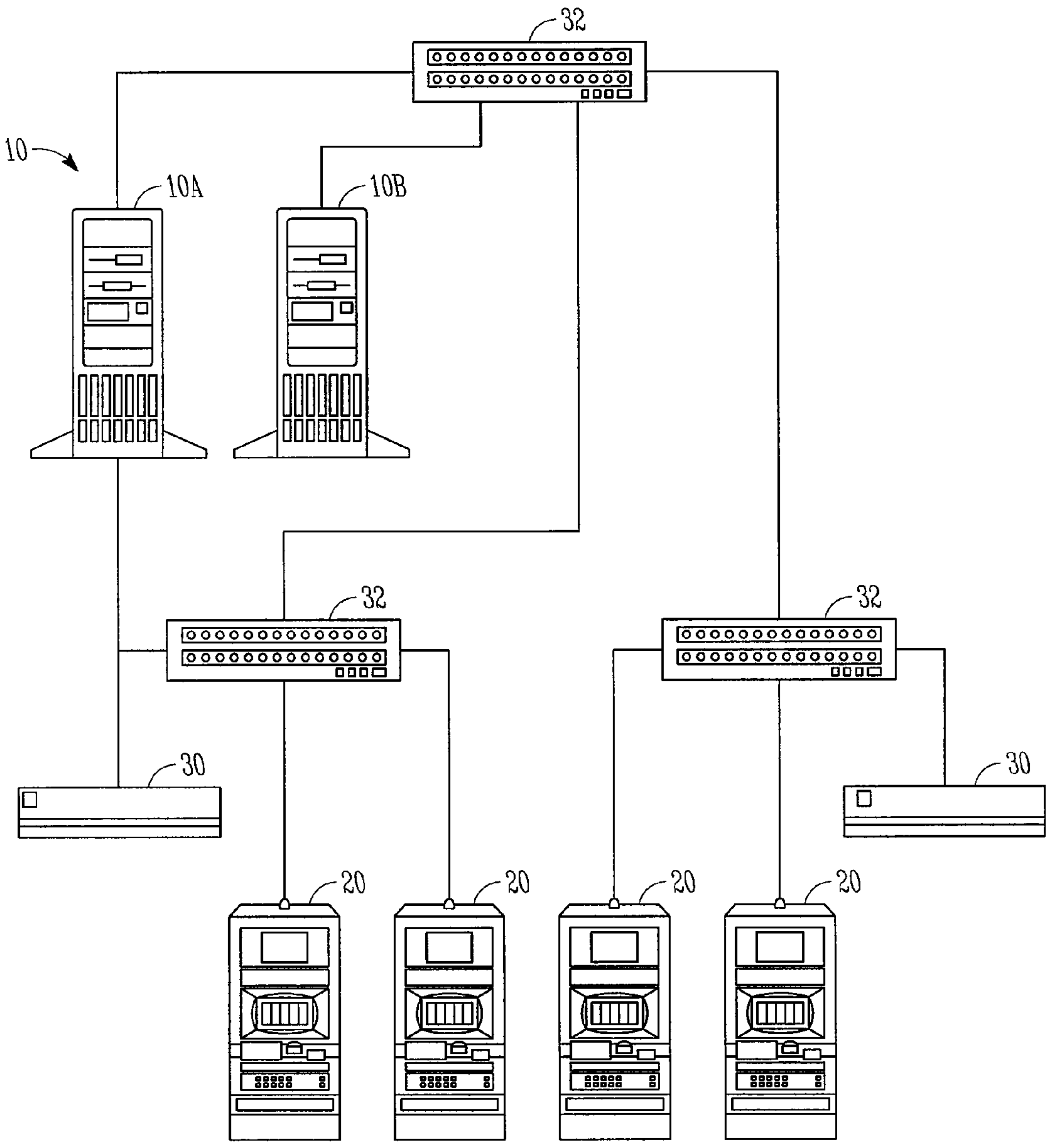
FIG. 3 is a network diagram, according to example embodiments of the invention.

As mentioned above, these gaming terminals are connected in a local area network using a flat, peer-to-peer physical topology as shown in FIG. 3. The network may be an open or public protocol such as TCP/IP (Transmission Control Protocol/Internet Protocol). Other network communication protocols that potentially could be used include ATM, SLIP, PPP, or a layer protocol transmitted onto TCP/IP. The LAN may also use any physical communication medium needed (e.g., Ethernet, fiber optic, wireless Ethernet, etc.). The architecture is scalable and can be divided into multiple logical tiers.

The peer-to-peer configuration allows gaming terminals to act as servers, providing gaming applications directly to other gaming terminals. In some embodiments, the game application is not served from a single fixed place, as is the case for systems with a central server. Instead, some embodiments allow the game application to be served from potentially any gaming terminal.

FIG. 3 shows a typical peer-to-peer network using a distributed application server 10*a* and gaming terminals 20 connected by a TCP/IP Ethernet network. The distributed application server 10*a* is used to provide administrative functions required to establish a virtual communication network 54 to enable the gaming terminals to act as gaming application servers to other gaming terminals in the network. In essence, the gaming network 52 helps establish the virtual communication network 54.

Various switches 32 and carousel controllers 30 increase efficiency of communications on the network. A carousel controller 30 may be used to link a local bank of gaming terminals to increase network efficiency. The carousel controller 30, however, is not necessary to set up some embodiments of the invention. Switches are also available to increase communication efficiency. Switches may be used at the carousel controller 30 to restrict associated network traffic to the carousel controller network segment. Each carousel controller 30 may further be connected to the distributed application server 10*a*. Other servers, such as 10*b*, may also be provided on the network to perform specialized gaming functions for the gaming terminals on the network. These gaming functions may include accounting, player tracking, progressive game controls, and cashless gaming. These servers are described below.

The progressive computer 10*b* of FIG. 3 manages a variety of promotional bonuses such as multiple jackpots, mystery jackpots, progressive jackpots, or player specific bonuses. The progressive computer also has Wide Area Progressive (WAP) game management data capability that allows multiple gaming terminals to contribute to, and compete for, system-wide jackpots.

Any number of additional servers may be used in the network, which operate transparently to the distributed application server 10*a*. These servers provide the following gaming functions, and although not shown in FIG. 3, are similarly connected to the network, as are servers 10*a* and 10*b*.

The slot accounting server monitors the financial transactions occurring on each individual gaming terminal 20 by collecting data such as credits in, out, played and won, the titles, terminals, denominations, and number of games played, the duration and specific times of play. The amount and types of collected audit data may be varied to suit a particular casino. The slot accounting server may compile an accounting report based on the data received from each of the individual gaming terminals, which may be used by management to assess the performance and profitability of the gaming terminals 20.

The player tracking server tracks individual player usage of the gaming terminals 20. When a player enrolls in a casino's player tracking system, often called a "slot club" or a "rewards program," the casino issues a player identification card encoded with a player identification number that uniquely identifies the player. The identification card may, for example, be a magnetic card or a smart (chip) card. Each terminal 20 is fitted with a card reader (e.g., card reader 24 in FIG. 1) into which the player inserts his or her identification card before playing the associated terminal 20. The card reader reads the player's identification number off the card and informs the player tracking computer connected thereto of the player's subsequent gaming activity. This allows gaming establishments to target individual players with direct marketing techniques, comps, and other rewards according to the individual's usage.

The cashless gaming server manages and validates electronic funds transactions. For example, the cashless gaming computer may store funds in monetary accounts at the computer, authorize the transfer of funds between accounts and gaming terminals 20, and associate the accounts with portable instruments such as cards or tickets used by players at the gaming terminals 20.

Figure 4:
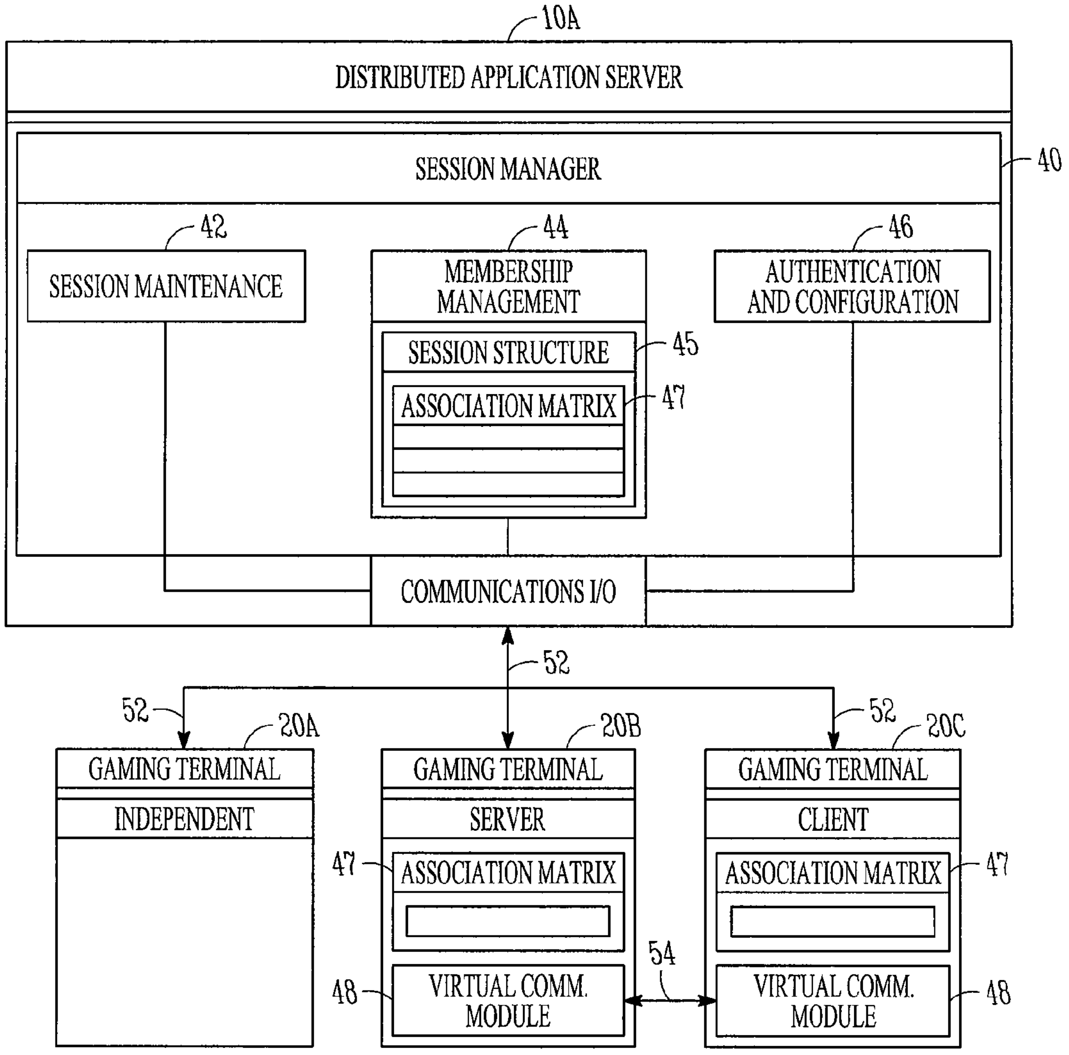
FIG. 4 is a block diagram of using a carousel controller to implement a virtual communication network between gaming terminals, according to example embodiments of the invention.

The servers 10 described above are all normally found in gaming establishments and generally function independently to carry out their specific gaming functions. These servers operate transparently to the other servers on the network. As noted above, to start distributed gaming sessions, a dedicated distributed application server 10*a* may be used, though if needed, any number of gaming functions may be incorporated into a single server, as shown in FIG. 4. The distributed application server 10*a*, or simply server, controls the administrative functions governing the shared use of gaming applications among the gaming terminals using the session manager 40.

The session manager 40 is the mechanism that organizes distributed application sessions, also known as shared gaming sessions. These shared gaming sessions are community games that allow players at individual gaming terminals to share the same game experience. The session manager 40 is a software module that typically resides on the distributed application server 10*a*. The session manager 40 is responsible for initiating, maintaining, and terminating the distributed application session (gaming session). The session manager 40 responds to these signals and performs its function through three primary software sub-modules: an authorization and configuration service module 46, a session maintenance module 42, and a membership management module 44.

The eligibility of a gaming terminal to participate in a session is determined by the authorization and configuration service module 46. Eligibility is a configuration issue and refers to whether or not a specific gaming terminal is allowed to participate in a particular distributed application. Eligibility may depend upon a variety of factors that include (but are not limited to) gaming terminal firmware, the distributed application on the terminal, and physical location. In addition, the eligibility of a gaming terminal (or group of gaming terminals) to participate in a particular distributed application may change over time.

The authorization and configuration service module 46 maintains a persistent data store that defines the eligibility matrix of all gaming terminals and distributed applications under its jurisdiction. Through this eligibility matrix the session manager 40 may verify that a requesting participant is eligible to join the specified session. The authorization and configuration service module 46 will forward any changes in the eligibility of participants to the membership management module 44 of the session manager 40.

The membership management module 44 of the session manager 40 is responsible for creating an association matrix 47 (or simply association) for the gaming terminals that are participating in a distributed application. To perform this function, the membership management module 44 distinguishes gaming terminals by eligibility and participation. To participate, the gaming terminal must first be eligible as determined by the authorization and configuration service module 46. The association matrix 47 contains all of the participating gaming terminals in a specific distributed application session. Participation refers to the state where an eligible participant has joined a particular session and can both send and receive application messages. Active participation may be mandatory (and automatic). Conversely, active participation may be voluntary for some game types. As an example, a player has the option of placing side bets in a community-based bonus game, but is not required to do so.

The association matrix 47 created by the membership management module 44 is dynamic as players enter and leave the game, either voluntarily or involuntarily. During any particular session a player at a gaming terminal can be added to the session, dropped from the session, or can voluntarily terminate the session. To join the shared gaming session, a gaming terminal sends an add signal to the distributed application server 10*a*. To be dropped from the shared gaming session, the gaming terminal sends a drop signal to the distributed application server 10*a*. Besides voluntary requests to leave the distributed gaming session, the membership management module 44 may receive eligibility notifications from the authorization and configuration service module 46. These notifications are processed by the membership management module 44 to change the status of the gaming terminal and require player removal from the session.

To provide orderly control over changing conditions the session manager 40 dynamically updates the association matrix 47 to account for changes in participation. The revised association matrix 47 is communicated to the distributed application gaming network to modify the virtual communication network 54 to reflect changes in participation.

The membership management module 44, in addition to maintaining participation status, also enables the distributed application server 10*a* to establish a virtual communication network 54 to allow the routing and distribution of application messages between gaming terminals that are active participants in the distributed application. The session manager 40 controls the shared gaming session utilizing session management messages that coordinates the virtual communication network 54 linking participating gaming terminals, and all other messaging requirements necessary to manage the distributed application. The session manager 40 messages originate from the server and perform all the necessary communications to implement and terminate the shared gaming application. In contrast, the application messages originate from the participating gaming terminals to support the shared gaming application.

Although the peer-to-peer configuration discussed above has many advantages, it introduces a level of complexity with gaming applications that require special consideration for such a system to effectively control communications between gaming terminals. For example, each gaming session may have a unique set of gaming terminal participants. Some peer-to-peer architectures may require a systematic software methodology with a hardware configuration to ensure that messages are correctly broadcast and received by participating gaming terminals. To handle such dynamic considerations associated with wagering type games, some embodiments include a virtual communications module 48 to coordinate communications between gaming terminals.

The session manager 40 enables the virtual communications module 48 to establish the peer-to-peer communications between the gaming terminal acting as the application server with other participating gaming terminals. The session manager 40 establishes a virtual communication network 54 using the session structure 45 and its association matrix 47 created by the membership management module 44. The distributed application session structure 45 contains the distributed application session ID, the distributed application type ID (to identify the game), and the association matrix 47. With the association matrix 47, the distributed application server 10*a* can administer and organize the communication flow between the gaming participants, creating a virtual communication network 54 for each gaming session.

The association matrix 47 identifies the participating gaming terminals and determines the virtual communication network 54 that the distributed application server establishes. Machine identifiers associated with the participating gaming terminals, and any other ancillary devices required, are used to build the association matrix 47. Not all information contained in the session structure 45 may be necessary for establishing the virtual communication network 54. The use of the association matrix 47 ensures that the gaming terminals are both eligible and participating in the shared game.

The information contained in the association matrix 47 may vary dependent upon the number of simultaneous distributed applications allowed at each gaming terminal. If the gaming terminal is limited to a single distributed application, only a limited data set may be needed. If the gaming terminal is running multiple distributed applications simultaneously, however, the additional information from the session structure 45 may need to be imported into the association matrix 47 to maintain administrative control over the network.

With the association matrix 47, the gaming terminals can use the virtual communication network 54 to communicate with other participating gaming terminals. Through this virtual communication network 54, application management messages may be sent between participating gaming terminals to allow game sharing. The virtual communication network 54 is sufficiently flexible to allow senders to tag application messages to show the type of delivery, including delivery to all session participants, to a specific participant, to the host, etc.

There are at least two possible implementation embodiments through which the association matrix 47 and the virtual communication network 54 can function. The two embodiments are the proxy and broker model, and may be distinguished by their location and the ownership of the virtual communication network 54. In the broker model as shown in FIG. 4, the session manager 40 creates a virtual communication network 54 directly between the gaming terminals. As a result, the session structure 45 is created in the distributed application server 10*a*. The association matrix 47 is subsequently transferred to at least the server gaming terminal.

These games only require communication between a server gaming terminal and a selected client terminal. Several client gaming terminals may participate in this shared game application, but communication channels may only be created between the server gaming terminal and a participating client gaming terminal.

In more complicated games, it may be necessary to establish a communication channel between two client terminals participating in a shared gaming application. In this case, the association matrix 47 may need to be downloaded to all the participating gaming terminals 20*b*, 20*c* involved in the shared application. The gaming terminals within the association matrix 47 may communicate directly to each other through the virtual communication network 54 defined by the association matrix 47.

The association matrix 47 may, in some cases, be downloaded and stored in each of the gaming terminals before it is called upon to establish a virtual communication network 54. However, in most cases, the association matrix 47 will be downloaded only after a triggering event occurs that results in a request for a shared gaming session. In either case, the association matrix 47 may also be downloaded to ancillary equipment that may be necessary to efficiently establish the virtual communication network 54. These ancillary devices include switches, routers, and other similar types of network equipment.

The advantage of the broker model system is reduced network traffic because of the direct communication, and reduced latency once the virtual communication network 54 is established. The reduced latency decreases system response time and is particularly useful for those games requiring communication of time sensitive information.

One disadvantage of the broker model is the complexity introduced by the need to replicate and synchronize the association matrix 47 for each participating gaming terminal. This is particularly burdensome as gaming terminals enter and leave an existing gaming session. The need to update and distribute association matrices increases the time to set up and terminate associations. This time lag introduces the possibility of gaming application errors as gaming terminals are added or dropped from the session.

Figure 5:
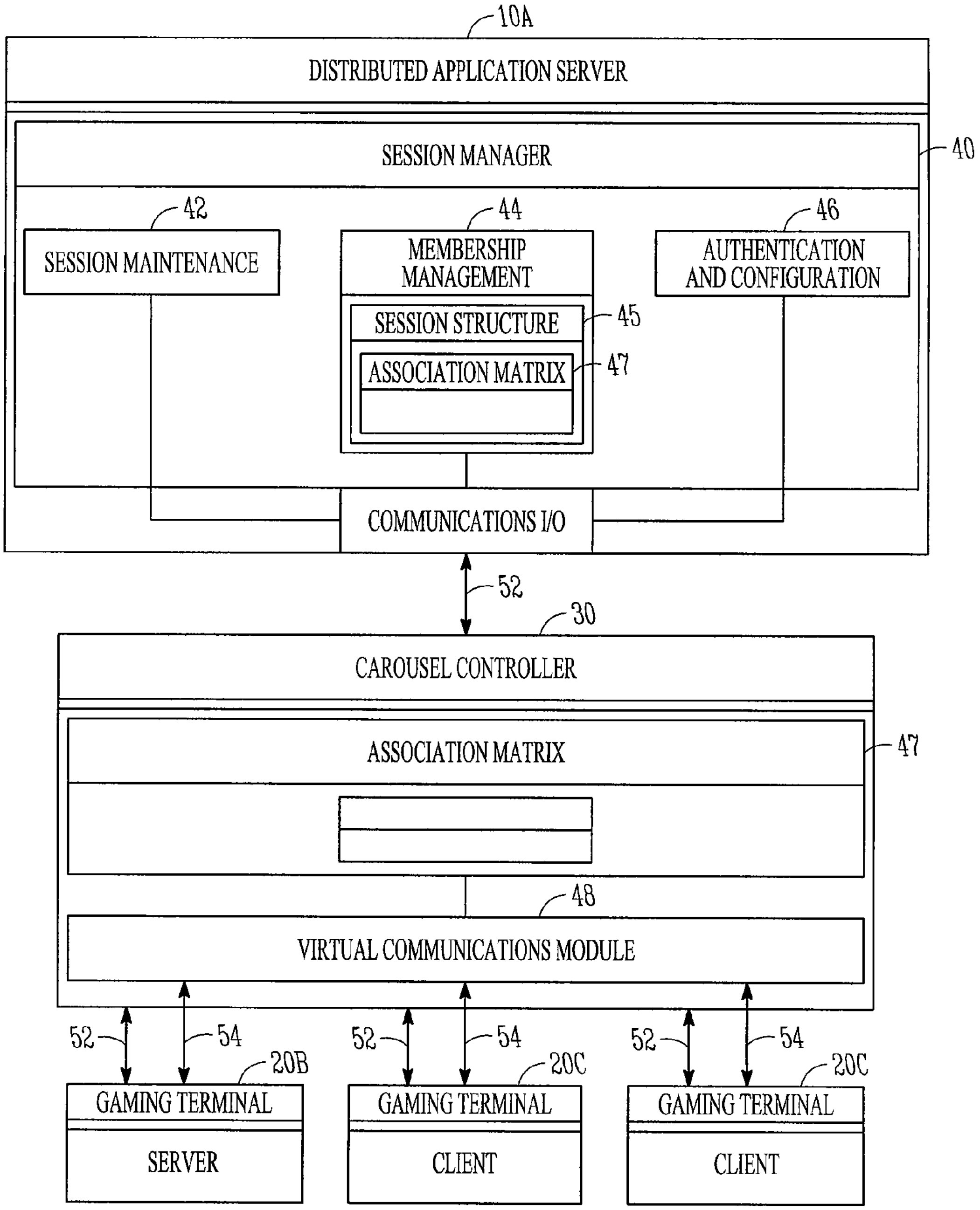
FIG. 5 is a block diagram of using a virtual communication network implemented directly between gaming terminals, according to example embodiments of the invention.
Figure 6:
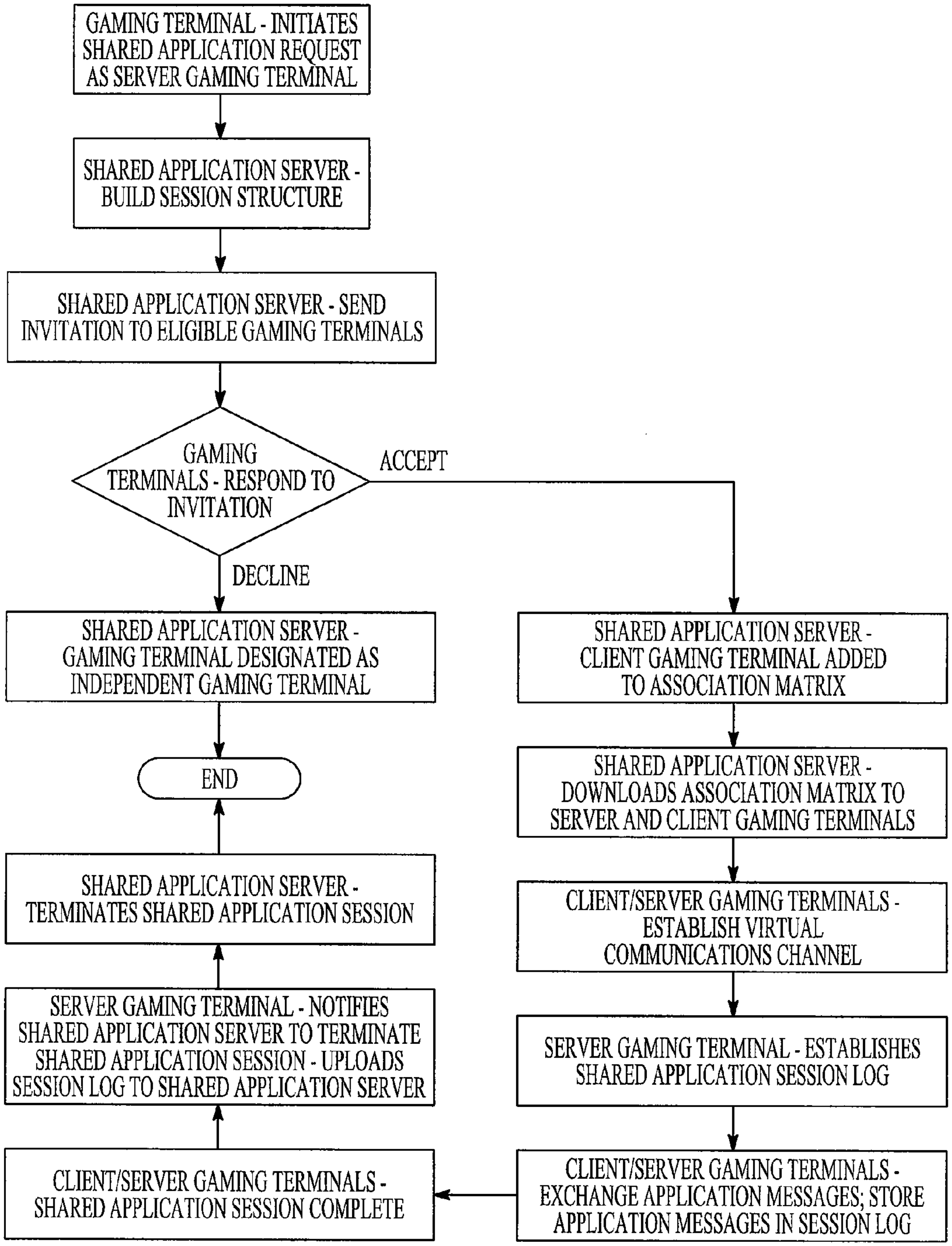
FIG. 6 is a software flowchart for establishing and operating a shared gaming session, according to example embodiments of the invention.

In contrast to the embodiment described above, in the proxy model shown in FIG. 5, the association matrix 47 resides on a carousel controller 30. This is known as the proxy model as depicted in FIG. 5. In the proxy model, the association matrix 47 is downloaded from the distributed application server 10*a* to the carousel controller 30. The carousel controller 30 then separately routes application messages to each individual gaming terminal using either a master-slave protocol, or a standard client/server protocol. Although this communication system is less complex than the broker model, it is more limited with respect to communications speed, at least in a master-slave communication protocol.

The communication methodology described above allows some embodiments establish peer-to-peer communications between gaming terminals and allows gaming applications to be shared among designated gaming terminals. The distributed application begins when a gaming terminal initiates the distributed application session. As part of the gaming terminal's individual game programming, certain triggering events may occur during game play to cause the gaming terminal to become configured as a server. The triggering gaming terminal notifies the distributed application server 10*a* and requests a game session.

The distributed application session manager 40, residing on the distributed application server 10*a*, through the session maintenance module 42, controls the start up and termination of the session. The gaming session is initiated with a session initiation signal from one of the gaming terminals in the network. Similar to the proxy model discussed above, a session structure 45 and an association matrix 47 for each gaming session is created.

The gaming session association matrix 47 identifies the server gaming terminal 20*b* acting as a temporary server for the distributed application and the client gaming terminals 20*c* participating in the distributed application.

All the above information including the association matrix 47, the application profile, the session ID, etc., is used by the distributed application server 10*a* to create a session structure 45 for each distributed application requested by a gaming terminal. The session structure 45 is used by the session manager 40 to create the association matrix 47 necessary to allow the establishment of a virtual communication network 54 between participating gaming terminals.

Before the association matrix 47 can be determined, however, each of the players at each of the eligible gaming terminals must respond to an invitation sent by the distributed application server 10*a* to join the shared gaming application. Players may either accept or reject participation in the gaming session. For those gaming terminals that accept participation in the gaming session a join request is set to the distributed application server 10*a*. The join requests are sent to the authorization and configuration service module 46 for validation of the requester's eligibility to join the session. The session maintenance module 42 then either accepts or refuses the request.

Once the gaming terminals reply to the invitation, either accepting or rejecting the invitation, the session manager 40, in turn, facilitates the connection of the gaming terminal acting as server to those individual gaming terminals that have accepted the invitation (i.e., client gaming terminals). The distributed application server 10*a* associates all participating gaming terminals with the gaming session ID and establishes an association matrix 47 to create a virtual communications channel for the participating gaming terminals. The distributed application server performs this function by providing all necessary information such as machine addresses to the gaming terminals involved in the community base game through the association matrix 47 (or in the case of the proxy model, supplying the association matrix 47 to the carousel controller 30). With this information provided by the distributed application server 10*a*, each enrolled gaming terminal can communicate with the gaming terminal acting as server. The triggering gaming terminal (i.e., the server gaming terminal 20*b*), serves the gaming application to all of the active participating gaming terminals (i.e., client gaming terminals 20*c*). During this process, application messages are exchanged between the client gaming terminals and the serving gaming terminal to accomplish game play. The server gaming terminal establishes a session log that records all exchanged application messages and any session manager messages exchanged between the distributed gaming server and the server gaming terminal regarding the session.

Once the distributed application has reached its final game outcome, the gaming session is terminated with a session termination signal from the gaming terminal serving the gaming application. The session termination signal is sent to the session maintenance module 42 on the distributed application server 10*a*. The session maintenance module 42 terminates the distributed application, and returns the gaming terminals to their normal operating mode. In addition to the termination notification, the server gaming terminal also uploads a session log to the session manager 40. The session manager 40 uses a session log as part of the termination procedure to account for winnings and losses between gaming terminals. The players at these gaming terminals will have their accounts debited and credited accordingly.

A single distributed application server 10*a* may be used to control several or multiple distributed gaming sessions. For example, several different progressive games and several different community-based bonus games could be in simultaneous operation. Multiple types of distributed applications may be available to a single gaming terminal. Some of these games may be restricted to a single carousel controller 30 and others may operate over an entire casino or wide area.

Any particular gaming terminal (or group of gaming terminals) may participate in an overlapping set of distributed applications. For example some gaming terminals might only be participating in a local progressive, while other gaming terminals are participating in both a progressive and a community-based bonus game. Each of these distributed application sessions has a unique distributed application session ID. This session ID allows the site controller to individually monitor and control gaming terminals grouped in a distributed application session.

The above and described peer-to-peer gaming network and its associated session manager 40 enables new and more exciting gaming opportunities through shared gaming experience. The examples that follow demonstrate the diversity of games that can be implemented on some embodiments of the invention. These games run the gamut of competitive, collaborative, and any other shared gaming experience.

For example some embodiments of the invention allow a player to place a side bet on another player's game outcomes. In this situation, an outcome may be triggered on a game that allows all eligible players (e.g., players linked to a specific carousel controller 30) to participate in the outcome of a bonus game. The player who hits the bonus round is called the initiator and is the only one who directly participates in the bonus game play. The other players on the carousel are notified that a bonus game has been triggered and allowed to make side bet wagers. Participation in this bonus game may be voluntary. The bonus round may be displayed on eligible gaming terminals (e.g., those gaming terminals on the same carousel) so they can observe the outcome. Once the bets are placed, the triggering gaming terminal is allowed to complete play of the bonus game. The triggering player is rewarded based on the bonus game outcome. All other participating players who have successfully wagered on the outcome of the triggering terminal are also then rewarded. This game may be viewed as individual side bet games with a shared determination of the outcome.

More sophisticated side betting games can also be created. For example, the triggering player may be awarded a percentage of the total wagers made by the participating players. This increases the desirability for playing the game with the hope that a player might become a host for the bonus game and the eligible for further awards.

Direct competition with other players is another variation of shared gaming that some embodiments allow to be implemented. One embodiment for direct competition uses a base game with a bonus game in a gaming terminal. A player wagers on the base game to become eligible for play in the bonus game. The base game is an individual game and not a community-based game. The base game, however, may fund the bonus pool for the bonus game. The bonus game is a community-based game in which players may compete head-to-head for the bonus pool jackpot. The bonus game may be entirely random or have some elements of skill involved.

Alternately, another direct competition embodiment may involve only a base game that is served to all eligible participating gaming terminals. Certain enhancements can be made to the gaming as described above where the player who controls the serving gaming terminal is allowed to collect a higher percentage of winnings or a percentage of the total wagers made in the game.

Another gaming method that may use distributed applications with some embodiments is collaborative team play. For example, players may choose to form teams to increase their probability of achieving a winning outcome by one team member. Any winning outcome achieved by the team is split evenly among the team members participating at the time of the winning outcome. For example, players in a bank of progressive gaming terminals may decide to team rather than playing individually for the progressive jackpot, splitting any winnings equally among the team members. Players could selectively opt in or opt out of the team. Alternately, players could make side bets on other players while playing their own individual progressive game. The side bet would allow a player to also win an award if another player hit the jackpot.

Yet another gaming method that can be used in some embodiments involves using two servers to provide progressive type games. In progressive type games a portion of each wager is assigned to a bonus pool. Several gaming terminals may contribute to this bonus pool. A single player may win the entire bonus pool with the winning game outcome. A progressive server is typically linked to each of the gaming terminals participating in the progressive game. This progressive server typically handles the accounting functions of the progressive game and verifies jackpot winning gaming terminals. To further enhance this standard progressive type game, some embodiments can be used to provide additional enrichment to the game play. For example, it is possible to offer players the potential to collaborate as teams, pooling their combined wagers to win the progressive. Alternately, players at gaming terminals with certain outcomes may trigger a bonus event that allows players to place side bets on another player's game outcome.

Still another embodiment offered by some embodiments of the invention allows two players to share the same game. In certain situations, two players may wish to confer and come to a consensus on how to play a single game. In these situations, rather then having the players crowd a single gaming terminal, some embodiments allow the same game to be presented on the visual display of an adjacent gaming terminal. Either player may then wager or select optional gaming parameters.

The above games demonstrate the remarkable diversity of some embodiments of the invention with its unique peer-to-peer gaming network in association with its session manager 40 implemented on a network server.

What is claimed is:

1. A method comprising:

determining whether a first gaming terminal is eligible to participate in a shared gaming session comprising a shared bonus game, wherein the determination of eligibility is based on a characteristic of the first gaming terminal;

transmitting, from a distributed application server to the first gaming terminal, an invitation to participate in the shared gaming session;

receiving a reply from the first gaming terminal indicating that the invitation has been accepted;

transmitting, from the distributed application server to a second gaming terminal, an indication that the first gaming terminal will participate in the shared gaming session, wherein the second gaming terminal will serve the shared bonus game to the first gaming terminal;

permitting players at participating gaming terminals, including the second gaming terminal, to place side bet wagers on an outcome of the shared bonus game;

receiving a session termination signal from the second gaming terminal, the session termination signal indicating that the shared bonus game is complete;

receiving a session log to account for winnings and losses between the first and second gaming terminals;

providing an award to the first gaming terminal based on the outcome of the shared bonus game;

providing awards to the other participating gaming terminals based on successful ones of the side bet wagers; and terminating the shared gaming session.

2. The method of claim 1 further comprising:

receiving a session initiation request from the second gaming terminal.

3. The method of claim 1, further comprising:

transmitting, to the second gaming terminal, another invitation to participate in another shared gaming session;

receiving a reply from the second gaming terminal indicating that the other invitation has been accepted; and transmitting, to the first gaming terminal, an indication that the second gaming terminal will participate in the other shared gaming session, wherein the first gaming terminal will serve another gaming application to the second gaming terminal.

4. The method of claim 1, wherein the transmission of the invitation to participate in a shared gaming session occurs in response to one or more events selected from the group consisting of player input, a bonus round, players associated with the first and second gaming terminals forming a team.

5. The method of claim 1, wherein the shared gaming session enables a player associated with the gaming terminals to wager on a shared gaming session outcome that is associated with another player.

6. The method of claim 1, wherein the shared gaming session enables players to compete or collaborate with other players participating in the shared gaming session, and wherein selections made by the players affect an outcome of the shared gaming session.

7. The method of claim 1, wherein during the shared gaming session, shared gaming session data is transmitted between the first gaming terminal and the second gaming terminal.

8. The method of claim 1, wherein the second gaming terminal presents an option to participate in the shared gaming session or to play an individual game offered at the second gaming terminal.

9. The method of claim 1, wherein determining whether the first wager gaming terminal is eligible to participate in the shared wager gaming session comprises determining whether specific firmware is on the first wager gaming terminal.

10. The method of claim 1, wherein determining whether the first wager gaming terminal is eligible to participate in the shared wager gaming session comprises determining whether a particular application is on the first wager gaming terminal.

11. The method of claim 1, wherein determining whether the first wager gaming terminal is eligible to participate in the shared wager gaming session is based on a first wager gaming terminal's physical location.

12. The method of claim 1, wherein determining whether the first wager gaming terminal is eligible to participate in the shared wager gaming session comprises determining whether the first wager gaming terminal is connected to a specific carousel controller.

13. The method of claim 1, further comprising providing another award to the first gaming terminal based on a percentage of a total of the side bet wagers.

14. A non-transitory computer-readable medium including instructions that are computer-executable by a distributed application server, the instructions comprising:

instructions to determine whether a first gaming terminal is eligible to participate in a shared gaming session comprising a shared bonus game, wherein the determination of eligibility is based on a characteristic of the first gaming terminal;

instructions to transmit, from the distributed application server to the first gaming terminal, an invitation to participate in the shared gaming session;

instructions to receive a reply from the first gaming terminal indicating that the invitation has been accepted;

instructions to transmit, from the distributed application server to a second gaming terminal, an indication that the first gaming terminal is participating in the shared gaming session, wherein the second gaming terminal will serve the shared bonus game to the first gaming terminal;

instructions to permit players at participating gaming terminals, including the second gaming terminal, to place side bet wagers on an outcome of the shared bonus game;

instructions to receive a session termination signal from the second wager gaming terminal, the session termination signal indicating that the shared bonus game is complete;

instructions to receive a session log to account for winnings and losses between the first and second wager gaming terminals;

instructions to provide an award to the first gaming terminal based on the outcome of the shared bonus game;

instructions to provide awards to the other participating gaming terminals based on successful ones of the side bet wagers; and instructions to terminate the shared gaming session.

15. The computer-readable medium of claim 14, the instructions further comprising:

instructions to receive a session initiation request signal from the second gaming terminal.

16. The computer-readable medium of claim 14, the instructions further comprising:

instructions to transmit, to the second gaming terminal, another invitation to participate in another shared gaming session;

instructions to receive a reply from the second gaming terminal indicating that the other invitation has been accepted; and instructions to transmit, to the first gaming terminal, an indication that the second gaming terminal will participate in the other shared gaming session, wherein the first gaming terminal will serve another gaming application to the second gaming terminal.

17. The computer-readable medium of claim 14, the wherein the instructions to determine whether the first wager gaming terminal is eligible to participate in the shared wager gaming session further comprise:

instructions to determine whether the first wager gaming terminal is eligible to participate in the shared wager gaming session based on a first wager gaming terminal's physical location.

18. The computer-readable medium of claim 14, wherein the instructions to determine whether the first wager gaming terminal is eligible to participate in the shared wager gaming session further comprise:

instructions to determine whether the first wager gaming terminal is eligible to participate in the shared wager gaming session based whether the first wager gaming terminal is connected to a specific carousel controller.

19. The computer-readable medium of claim 14, the instructions further comprising:

instructions to provide another award to the first gaming terminal based on a percentage of a total of the side bet wagers.

20. A system comprising:

a plurality of gaming terminals;

a distributed application server communicatively coupled to the gaming terminals;

a slot accounting server communicatively coupled to the gaming terminals and configured to monitor financial transactions at the gaming terminals;

a cashless gaming server communicatively coupled to the gaming terminals and configured to manage and validate electronic fund transactions between a player account and at least one of the gaming terminals, wherein the distributed application server comprises:

an authorization and configuration service module configured to store and maintain eligibility indicators associated with gaming terminals, wherein the eligibility indicators are stored in a data structure accessible by the authorization and configuration service module and wherein one of the eligibility indicators indicates whether a corresponding one of the gaming terminals is eligible to participate in a shared gaming session comprising a shared bonus game;

a session maintenance module configured to:

receive a session initiation signal from one of the gaming terminals;

determine whether the one of the gaming terminals is eligible to participate in the shared gaming session to act as the game server in the shared gaming session, wherein the determination is based on the corresponding one of the eligibility indicators;

determine whether another one of the gaming terminals is eligible to participate in the shared gaming session, wherein the determination of eligibility is based on a characteristic of the another one of the gaming terminals;

transmit to the another one of the gaming terminals, an invitation to participate in the shared gaming session;

receive a reply from the another one of the gaming terminals indicating that the invitation has been accepted;

transmit to the one of the gaming terminals an indication that the another one of the gaming terminals will participate in the shared gaming session;

receive a session termination signal from the one of the gaming terminals, the session termination signal indicating that the shared bonus game is complete;

receive a session log to account for winnings and losses between the first and second gaming terminals; and terminate the shared gaming session; and a membership management module configured to create and manage association indicators, wherein the association indicators indicate which gaming terminals are participating in the shared gaming session initiated by the session initiation signal received by the one of the gaming terminals acting as the server of the shared gaming session;

and wherein the one of the gaming terminals notifies other gaming terminals of the opportunity to place side bet wagers on an outcome of the shared bonus game, and wherein the system is further configured to perform the following actions after the session maintenance module receives the session log:

provide an award to the first gaming terminal based on the outcome of the shared bonus game; and provide awards to the other participating gaming terminals based on successful ones of the side bet wagers.

21. The system of claim 20, wherein the association indicators can be modified during the shared gaming session.

22. The system of claim 20, wherein the membership management module is also configured to establish a virtual communication network for those of the gaming terminals that are participating in the shared gaming session.

23. The system of claim 20, further comprising a session manager configured to receive a session log associated with the shared gaming session, the session log indicating an outcome of the shared gaming session.

24. The system of claim 20, further comprising a session manager configured to debit or credit accounts associated with players at the gaming terminals, the debit or credit based on an outcome of the shared gaming session.

25. The system of claim 20, wherein the gaming terminals are members of a peer-to-peer network.

26. The system of claim 20, wherein the authorization and configuration service module is also configured to receive join requests from one or more of the gaming terminals and wherein the session maintenance module is also configured to accept the request to associate all participating gaming terminals with a gaming session identifier, the gaming session identifier identifying a shared gaming session with the one of the gaming terminals acting as the game server and all other gaming terminals acting as clients.

* * * * *

UNITED STATES PATENT AND TRADEMARK OFFICE

CERTIFICATE OF CORRECTION

PATENT NO. : 8,118,679 B2
APPLICATION NO. : 11/425481
DATED : February 21, 2012
INVENTOR(S) : Mark B. Gagner It is certified that error appears in the above-identified patent and that said Letters Patent is hereby corrected as shown below:

On the face page, in field (57), under “Abstract”, in column 2, line 3, delete “embodiment” and insert -- embodiment, --, therefor.

In column 12, line 42, delete “then” and insert -- than --, therefor.

In column 14, lines 60-61, in Claim 17, delete “the wherein the” and insert -- wherein the --, therefor.

Signed and Sealed this
Eighth Day of May, 2012

David J. Kappos
*Director of the United States Patent and Trademark Office*